J. DAVIS, 2d
Churn.
No. 53,123.
Patented March 13, 1866.
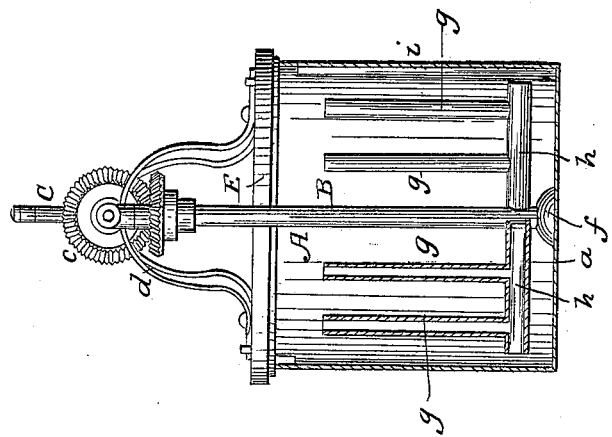
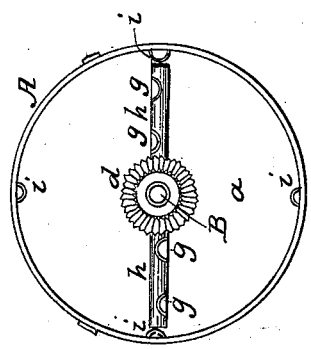
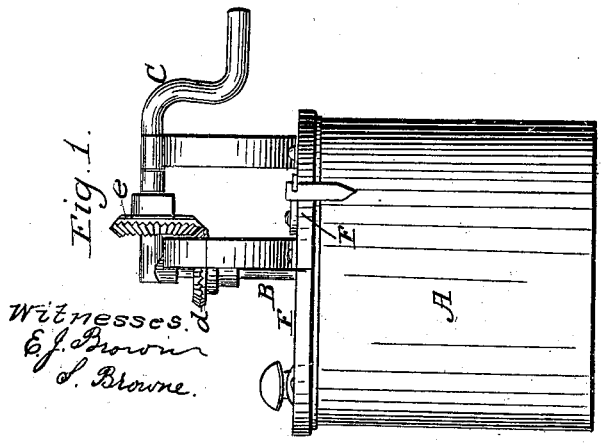

UNITED STATES PATENT OFFICE.

JOHN DAVIS, 2D, OF LAKE VILLAGE, NEW HAMPSHIRE.

IMPROVEMENT IN CHURNS.

Specification forming part of Letters Patent No. 53,123, dated March 13, 1866.

*To all whom it may concern:*

Be it known that I, JOHN DAVIS, 2d, of Lake Village, in the county of Belknap and State of New Hampshire, have invented an Improved Churn; and I do hereby declare that the following is a full and exact description thereof, reference being had to the accompanying drawings, making part of this specification—

Figure 1 being a side view of the churn; Fig. 2, a central vertical section thereof; Fig. 3, a top view of the churn, the cover being removed.

Like letters designate corresponding parts in all of the figures.

A cylindrical body, A, is the most suitable form, upon the removable cover E of which is mounted the driving-crank C and connecting gear-wheels $c\ d$, for turning a vertical dasher-shaft, B, its lower end revolving in a step, $f$, on the center of the bottom $a$ of the churn.

The dashers are composed of open half (more or less) tubes $g\ g$, situated vertically, and extending upward high enough to reach above the surface of the cream. They are joined to open, half-tube radial arms $h\ h$, attached to the dasher-shaft B. The arrangement of these half-tubes is substantially as shown in Figs. 2 and 3, being such that the open sides of the tubes shall always follow the convex sides in revolving. The effect is that, on account of the motion of the tubes through the cream, which cannot immediately close in behind them, so as to fill the hollows of the tubes, there is a constant tendency to produce a vacuum therein, whereby air is continually drawn down in the tubes and distributed all through the cream. The number of dasher-arms $h\ h$ and of tubes $g\ g$ on each arm may vary as desired. Besides the advantage of introducing the air into the cream, the half-tubes are readily kept clean, which is not the case with entire tubes. Besides, the air is distributed into the cream throughout the entire length of the tubes.

Vertical ribs $i\ i\ i\ i$ are secured to the inner surface of the churn-body. They serve, in connection with the dasher-tubes, to check the motion of the cream and to cause it alternately to move outward toward the periphery and inward toward the center, thereby not only causing a commingling of the currents, but intermixing the air from the half-tubes through all parts of the cream.

What I claim as my invention, and desire to secure by Letters Patent, is—

The open, vertical, and radial dasher half-tubes $g\ g$ and $h\ h$, arranged and operating substantially as and for the purpose herein specified.

The above specification of my improved churn signed by me this 12th day of October, 1865.

JOHN DAVIS, 2D.

Witnesses:
HUGH BLAISDELL,
S. M. HOIT.